J. LYMAN.
Protractor.
No. 20,356.
Patented May 25, 1858.
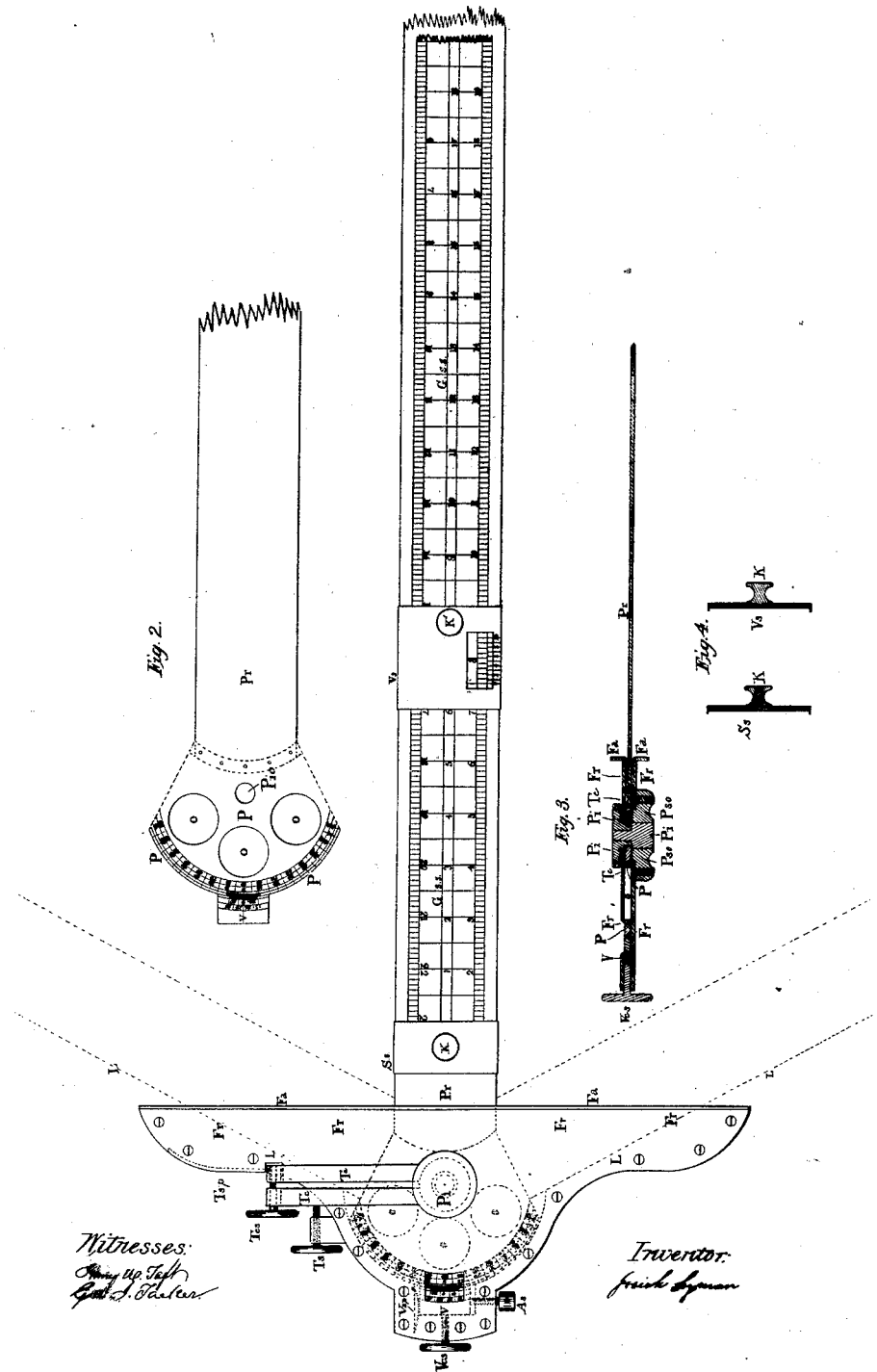

UNITED STATES PATENT OFFICE.

JOSIAH LYMAN, OF LENOX, MASSACHUSETTS.

PROTRACTOR.

Specification of Letters Patent No. 20,356, dated May 25, 1858.

*To all whom it may concern:*

Be it known that I, JOSIAH LYMAN, of Lenox, in the county of Berkshire and State of Massachusetts, have invented a new and useful machine or instrument for plotting surveys and for all purposes of drafting wherein courses and distances or lines and angles are required to be laid down upon paper or where lines and angles already laid down are required to be measured.

The name I apply to this machine or instrument is, "pantometric protractor;" and I do hereby declare that the following is a full, clear, and exact description of the construction and operation of the same, reference being had to the accompanying drawings, and to the letters of reference marked thereon, making a part of this specification; in which—

Figure 1, is a vertically perspective view of the graduated side of the entire instrument; all the parts thereof being shown in their true size and exact proportions. Fig. 2, is also a vertically perspective view of the protractor proper (taken out of its frame) with its vernier and long rule attached. Fig. 3, is a vertical and longitudinal section of the instrument through the center, with its sliding scale removed. Fig. 4, is a transverse section of the brass slides, and the scale with which they are connected, through their knobs, or thumb pieces.

In general, my invention consists of a combination of the protractor, drafting rule, and sliding, vernier scale.

To enable others skilled in the are to understand and use my invention, I will proceed to describe in detail its construction and operation.

P, represents the protractor proper, graduated to 70° (seventy degrees) on each side of zero; seen most distinctly in Fig. 2, but partially in Figs. 1, and 3. It is made of rolled brass, one eighth ($\frac{1}{8}$ inch) of an inch thick.

N. denotes north, E. east, and W. west. The figures on each side of N. indicate the degrees of arc, or angle, and the complement of the same.

V, denotes the protractor vernier, reading to minutes, or less; made of bronze, and $\frac{1}{8}$ inch (one eighth of an inch) thick.

P$i$. $o$. Fig. 2, denotes the pivot orifice; O, three orifices for lessening the weight.

P$r$. seen in Figs. 1, 2, 3, is the protractor rule, made of steel plate, 3 feet long, from the protractor face, 2 inches wide, and $\frac{1}{16}$ inch thick, riveted to the protractor proper. It is tempered, smoothly ground, and blued.

F$r$. Figs. 1, and 3, denotes the protractor frame. It consists of two plates of rolled brass $\frac{1}{16}$ inch thick, bent, or turned up at the faced edge. F$a$. thus forming a kind of flange as shown in Fig. 3. It may be diminished in weight by orifices, (without materially affecting its firmness or strength) or not, [which I do not deem essential. Nor do I deem it essential whether the protractor frame is wholly metallic, or wholly of wood, or partly of each material, but consider my invention in application to this part of the instrument, as including each of these conditions or constructions. The form of the frame in the accompanying model is not given as the best, but is so constructed as to show to the best advantage the principle and operation of the instrument, the true form being shown in the accompanying drawings.] These plates are separated by strips of rolled brass, a very little thicker than the protractor proper, (*i. e.* $\frac{1}{8}$ inch) extending from the dotted lines L L, to the curved edge of the frame on all sides except that of the face. These strips of brass are soldered to the lower plate for receiving the 16 screws which fasten the plates together.

V. *c. s.*, Figs. 1, and 3, is the vernier clamp screw.

V. *sp.*, Fig. 1, is the vernier spring, reacting against the adjusting screw A. *s*.

T. *c.*, Figs. 1, and 3, is the tangent clamp. T. *c. s.*, Fig. 1, the tangent clamp screw. T. *sp.* the tangent spring, lying between the brass plates of the protractor frame, and reacting against the tangent screw T. *s*.

P$i$., Figs. 1, and 3, is the compound pivot, made of bronze and brass, and tightly screwed to the protractor proper.

P. *so.* is a piece of hard wood containing the pivot socket, fastened to the lower plate of the protractor frame by screws, as seen in Fig. 3. It is not essential whether this socket piece is made of wood; or of bronze, with packing for smooth, easy friction, but I claim both constructions.

The tangent clamp with its appendages, (which is an apparatus for producing delicate motion) is to be used as represented in the drawings; or not, as shown in the model, at pleasure. It is not claimed as a part of the invention. But in case it is dispensed with, there are to be two socket pieces, like that (P. so.) represented in Fig. 3.

Fig. 4 exhibits a section of both the attached and vernier slides, through their respective knobs and the scale, removed from the rule. They consist of pieces of rolled brass $\frac{1}{40}$ inch thick, turned down at the edges for a flange, or guide, on the upper side of the scale, and pieces of brass about $\frac{1}{100}$ inch thick, on the under side of the same, riveted together through side strips of brass of the same thickness as the scale, which lie between the scale and the flanges, or guides. That one (of these strips) which is on the front side of the vernier slide, is the vernier itself. The attached slide S. s. is fastened to the scale by a steel screw, as seen in the figure. The vernier slide Vs. moves with smooth, easy friction on the scale.

G, S, S, Fig. 1, is a scale of tempered, smoothly ground steel plate, 2 feet long, 1½ inches wide, and $\frac{1}{20}$ inch thick, graduated on one side to inches and tenths; its vernier reading to hundredths, but easily read by an expert to thousandths. The inches on the other side may be divided into tenths, as in the figure, or, into eighths or twelfths, corresponding with the specific use to which the instrument may be applied; the vernier slide in that case being constructed with a vernier suited to the divisions on each side (or border) of the scale. The dimensions given above are to be varied to suit the specific use of the instrument.

An exactly square or rather rectangular drafting table is supposed to accompany the instrument, whose length is to its breadth as six to five. The instrument may be of different sizes to correspond with the specific use to which it is to be applied; but when it is of the dimensions given in the accompanying diagrams or drawings, the drafting table should be three feet long, two and a half feet wide; and one end, or side is assumed as north.

In using the protractor, its face is placed in contact with one of the ends, or sides of the table. If the instrument is rightly adjusted, set at zero, (i. e., with N. on the protractor coinciding with zero, on the vernier,) and placed in contact with that end or side which is assumed as north, with its graduated side up, all lines drawn by either edge of its long rule are meridians; (i. e. when applied to laying down, or measuring azimuth or horizontal angles,) and when the instrument set at zero, is placed in contact with either the east or west sides of the table, all lines drawn by either edge of its long rule will be parallels of latitude.

If I hold the instrument in my left hand, with its graduated side up, and its long rule in my right hand, and then unclamp the vernier clamp; by gradually bringing the rule toward my body, (on my right side,) the letter E. on the protractor continually approaches the zero point of its vernier, till I have obtained all angles between north, and north 62° 30′ east. And by carrying the rule in the opposite direction, the letter W. on the protractor continually approaches the zero point of its vernier, till I have obtained all angles between north, and north, 62° 30′ west.

When the instrument is used for drawing plans of elevation in architecture, the north point becomes zenith, and the east and west points become any or rather, those points of the horizon which lie in the projected plane.

For laying down on paper the angles specified above, the face of the protractor must be brought gently in contact with that end or side of the table which is assumed as north, or the opposite side; except when we wish to obtain parallels of latitude. Now, by inverting the protractor, (set, as we suppose it to be, at north 62° 30′ east, or north 62° 30′ west,) placing it in contact with either the east, or west sides of the table, and gradually carrying back the long rule to its former zero point, we obtain all angles between north, 27° 30′ east, or north, 27° 30′ west, and 90°; (i. e. the east and west points,) and also between south, 27° 30′ east, or south, 27° 30′ west, and 90°. Hence, in either position of the protractor, there is in it a susceptibility of producing 17½° beyond what is actually necessary on both sides of zero. For an azimuth motion of 45°, (instead of 62° 30′, named above) would give every possible course, or point of the compass. Therefore, for all points between 45° and 62° 30′, on each side of zero, we can use the instrument either side up, as convenience may require; [a very valuable property of the instrument.] Now, by repeatedly inverting the instrument, all these objects could be accomplished were the long rule susceptible of the same motion on one side only of zero, which it now has on both sides of that point, and in that case, a graduated arc of 80°, instead of 140° (the number of degrees now used) would be all that would be required. But in that case there would not be as there now is a test for every course. In other words we can now obtain what we could not in the case supposed, every point of the compass in two positions of the instrument, to the limit of its reading; that is, to a minute of a degree, or less.

The form of the instrument adopted has also a decided advantage over the one supposed, both in symmetry of construction, and adaptation to every variety of problem.

For taking distances, the scale is held by the knob of its attached slide K, Figs. 1, and 4, with one hand, and with the other the vernier slide K′, is carried to the required distance on the scale; the inches and tenths being read on the scale, at the edge of the latter slide, and the hundredths (and thousandths) on its vernier. Now, the protractor being set and clamped at the required angle, and slid on the table till its long rule is brought close to the starting point, or dot on the paper, the edge of either the attached slide or vernier slide is brought to the same dot, (*i. e.* so near to it as the semi-diameter of the prick used in making the dot,) and a second dot is made with the point of a very fine prick at the common edge of the long rule, and other slide. The scale is next carefully lifted from the rule, and the two dots are connected by fine lines, drawn with a hard, sharpened pencil, or drafting pen. The protractor is then set at the next required angle, brought to its proper position, close to the second dot, the vernier slide of the scale set at the next required distance, and the same operation repeated as before, and so on, till our work is finished. If we wish to measure toward the face of the protractor, we must measure from the vernier slide to the other, and vice versa.

In measuring angles and distances already laid down, we bring the rule of the protractor to coincide with the desired points on the paper, and having clamped its vernier, we bring the slides of the scale to coincide with the same points. We then read off the angle on the protractor, and the distance on the scale.

And I hereby state and affirm that the above described invention was made in June, one thousand eight hundred and fifty six; with the exception of the details of the framework; which details I improved and completed during the year one thousand eight hundred and fifty seven.

I claim—

1. The arrangement of the several verniers, limbs, scales and rule, in one instrument, in the manner described, for the purposes set forth.

2. I also claim the peculiar arrangement of the sliding vernier scale, by which it can be applied with equal readiness and facility to either side of the rule, so as to read the given angle, and its complement.

JOSIAH LYMAN.

Witnesses:
HENRY W. TAFT,
GEO. I. TUCKERS.